(12) United States Patent
Van Der Lee et al.

(10) Patent No.: US 10,935,483 B2
(45) Date of Patent: Mar. 2, 2021

(54) OPTICAL PARTICLE SENSOR DEVICE AND METHOD FOR OPERATING AN OPTICAL PARTICLE SENSOR DEVICE

(71) Applicants: Robert Bosch GmbH, Stuttgart (DE); TRUMPF Photonic Components GmbH, Ulm (DE)

(72) Inventors: Alexander Van Der Lee, Venlo (NL); Robert Weiss, Waldbronn (DE); Sören Sofke, Tübingen (DE); Hans Spruit, Waalre (NL); Jens-Alrik Adrian, Pfullingen (DE)

(73) Assignees: Robert Bosch GmbH, Stuttgart (DE); TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 16/541,675

(22) Filed: Aug. 15, 2019

(65) Prior Publication Data

US 2020/0056981 A1    Feb. 20, 2020

(30) Foreign Application Priority Data

Aug. 17, 2018  (DE) ..................... 10 2018 213 932.6

(51) Int. Cl.
  *G01N 15/14*  (2006.01)
  *G01N 15/02*  (2006.01)
  *G01N 15/00*  (2006.01)

(52) U.S. Cl.
  CPC ..... *G01N 15/1459* (2013.01); *G01N 15/0211* (2013.01); *G01N 15/1434* (2013.01); *G01N 2015/03* (2013.01)

(58) Field of Classification Search
  CPC .......... G01N 15/1459; G01N 15/0211; G01N 15/1434; G01N 2015/03
  USPC ......................................................... 356/342
  See application file for complete search history.

(56) References Cited

U.S. PATENT DOCUMENTS

2015/0020804 A1*  1/2015  Van Der Mark ... A61M 16/026
                                                128/203.14

* cited by examiner

*Primary Examiner* — Roy M Punnoose
(74) *Attorney, Agent, or Firm* — Maginot, Moore & Beck LLP (57) ABSTRACT

An optical particle sensor device comprises an optical emitter device for emitting a multitude of measurement laser beams; a detector device for detecting the measurement laser beams scattered on particles in the vicinity of the optical particle sensor device and for generating a single measuring signal assigned to this for each measurement laser beam; and an evaluation device for determining at least one estimated particle value for the number of particles per volume using at least one single measurement signal, wherein the evaluation device determines at least two estimated particle values for the number of particles per volume, which are based on at least partially different single measurement signals and/or a different number of single measurement signals, and on the basis of at least part of the estimated particle values, determines at least one output value for the particle load.

14 Claims, 4 Drawing Sheets

OPTICAL PARTICLE SENSOR DEVICE AND METHOD FOR OPERATING AN OPTICAL PARTICLE SENSOR DEVICE

This application claims priority to German Application No. DE 102018213932.6, filed on Aug. 17, 2018. The entire contents of the above-mentioned German patent application is incorporated herein by reference as part of the disclosure of this U.S. application.

The present invention relates to an optical particle sensor device and a method for operating an optical particle sensor device. In particular, the present invention relates to optical particle sensor devices, which are integrated into mobile devices and, in particular, into smartphones, wherein the invention, however, in principle, can be applied to any optical particle sensor devices and to appropriate methods for operating such optical particle sensor devices.

PRIOR ART

Many regions, particularly heavily populated ones, are subject to a significant burden caused by airborne particulate matter. This particle load is at least partly caused by humans, mainly due to the burning of carbon compounds caused by industry, road traffic, but also air transport, shipping transport and rail transport, and by private households. Due to the geographical arrangement of the individual airborne-particulate-matter polluters, large differences in local particle load can be observed. This applies outdoors in the same way it does inside closed spaces.

It is known that airborne particulate matter can lead to health impairments depending on the quantity and composition thereof, wherein the inhalable component of the airborne particulate matter is primarily responsible for this. The individual health risk essentially depends on how long and how much an individual is exposed to what type of particle load. Therefore, there is a need to quantify the local and respectively current particle load. The US National Air Quality Standard for Particulate Matter (PM) introduced a categorization of airborne particulate matter into $PM_x$ fractions, which takes into account the size or diameter x of the dust particles and thus the penetration depth of these dust particles into the respiratory tract and into the body of an individual. A distinction is made here, in particular, between coarse dust $PM_{10}$, which comprises particles with a diameter of up to 10 µm, fine matter $PM_{2.5}$ with particles with a diameter of up to 2.5 µm and ultrafine dust $PM_1$ with particles with a diameter of up to 1 µm.

The airborne particulate matter or particle load is frequently quantified using this PM standard. For this purpose, the dust particle mass per volume detected within a period of time is specified for at least one of the fractions $PM_x$. However, this information does not reflect the harmfulness of airborne particulate matter very adequately since the dangerous nature of the dust particles is not only determined by their size and weight. These characteristics only allow for statements about a possible penetration depth into the body to be made. The toxicity of the dust particles is also determined by their physical and chemical properties, namely their surface composition and/or chemical composition. Accordingly, there are other approaches for quantifying the airborne particulate matter or particle load.

The particle load quantification concerned here is based on a measurement of the number of dust particles within a volume. Based on the PM categorisation and well-known models for the size and mass distribution of dust particles, a very good estimated value can be determined for the particle load in the unit, dust particle mass per volume. However, the value, number of particles per volume, also makes a quantification of particle load with other approaches possible.

The increasing awareness of the problem of particle load is generating a demand for options for a rapid, local and autonomous measurement of the particle load, particularly in larger cities, which are particularly affected by a significant burden caused by airborne particulate matters. In addition to state or scientific institutes, private individuals are also interested in learning about the current particle load at their current location. There is therefore a need for portable miniaturized sensors for detecting the particle load.

An exemplary optical particle sensor is known from WO 2017/198699 A1. The particle sensor includes a laser sensor module with at least two lasers for emitting corresponding optical measurement laser beams, which are reflected on particles in the vicinity of the particle sensor. The reflected measurement laser beams are detected by means of a common detector and corresponding measurement signals are emitted. The detection principle is based on a self-mixing interference method (SMI method), which means that the reflected measuring beams interfere with the emitted measurement laser beams. The interference leads to changes in the optical and electrical characteristics of the laser, which can be detected and from which conclusions can be drawn on the characteristics of the particles in the vicinity of the particle sensor.

Another exemplary optical particle sensor for detecting particle densities of small particles with particle sizes ranging between 0.05 µm and 10 µm is known from WO 2018/104153 A1.

Particle sensors with a plurality of measurement laser beams generate a corresponding measurement signal for each measurement laser beam, which is then evaluated to determine the properties of the particles. However, under certain circumstances, individual or a plurality of measurement signals can be erroneous, for example, due to intrinsic errors, such as the failure of components of the particle sensor, or due to extrinsic errors, such as unwanted backscattering or shading by foreign objects in the light path.

DISCLOSURE OF THE INVENTION

The invention provides an optical particle sensor device and a method for operating an optical particle sensor device.

In accordance with a first aspect, the invention therefore relates to an optical particle sensor device comprising an optical emitter device, which is designed to emit a multitude N of measurement laser beams into a vicinity of the optical particle sensor device. A detector device is designed to detect the measurement laser beams scattered on particles in the vicinity of the optical particle sensor device and to generate a single measurement signal assigned to this for each measurement laser beam. An evaluation device is designed to determine at least one estimated particle value for the number of particles per volume using at least one single measurement signal. The evaluation device determines at least two estimated particle values for the number of particles per volume, which are based on at least partially different single measurement signals and/or a different number of single measurement signals. On the basis of at least part of the detected estimated particle values, the evaluation device determines at least one output value for the particle load.

In accordance with a second aspect, the invention therefore relates to a method for operating an optical particle sensor device with an optical emitter device for emitting a multitude N of measurement laser beams into a vicinity of the optical particle sensor device. The optical particle sensor device also comprises a detector device for detecting the measurement laser beams scattered on particles in the vicinity of the optical particle sensor device, wherein, for each measurement laser beam, a single measurement signal assigned to this is generated. Finally, the optical particle sensor device comprises an evaluation device for determining at least one estimated particle value for the number of particles per volume using at least one single measurement signal. At least two estimated particle values are determined for the number of particles per volume, which are based on at least partially different single measurement signals and/or a different number of single measurement signals. On the basis of at least part of the detected estimated particle values, at least one output value is determined for the particle load.

ADVANTAGES OF THE INVENTION

The invention provides an optical particle sensor device and a corresponding method for operating such an optical particle sensor device, which allow for reliable output values for the particle load to be generated even if intrinsic or extrinsic errors occur. One idea of the invention is to perform a plausibility analysis to detect such errors. Estimated particle values are generated accordingly, which are based on different single measurement signals. This means that different subsets of the single measurement signals are used to calculate estimated particle values which are different from each other. If the subsets are the same size, the obtained single measurement signals differ at least partially from each other. Conversely, the subsets can also have different numbers of single measurement signals. If the estimated particle values are now very different from each other, it can be concluded that there is an error at hand. By comparing a plurality of estimated particle values, preferably comparing at least three estimated particle values, under certain circumstances, an erroneous estimated particle value can even be identified. If, for example, one of the estimated particle values differs greatly from the remaining estimated particle values, which can be determined by a deviation from a mean value, this estimated particle value can be classified as being erroneous or less trustworthy, which is taken into consideration when calculating the output value for the particle load. Since, in this case, also the single measurement signals differ, which were used for the calculation of the estimated particle values, in addition, under certain circumstances, the error-prone single measurement signal and the corresponding measurement laser beam can also be determined.

The invention thus allows, on the one hand, for a kind of error correction so that the accuracy of the determined particle load can be increased, and the particle sensor is particularly suitable for mobile applications since unpredictable disturbances due to changing environmental conditions does not lead to erroneous measurement values. On the other hand, the invention optionally makes an error analysis possible, meaning a determination of at least one erroneous single measurement signal. This makes it easier to take appropriate countermeasures, such as issuing a warning to the user, who can possibly eliminate extrinsic sources of error and who is informed of intrinsic sources of error.

In accordance with a preferred further embodiment of the optical particle sensor device, the evaluation device is designed to determine on the basis of at least two estimated particle values, a total number of particles per volume, which are used as a basis for determining the at least one output value for the particle load. The total number of particles per volume can be determined, for example, by forming a mean value for the at least two estimated particle values. During the calculation, individual estimated particle values can also be ignored if it is detected that they are incorrect, which can be determined, for example, by calculating the deviation from the mean value. Furthermore, the estimated particle values can also be weighted differently to calculate the total number of particles per volume. Therefore, the total number of particles per volume is a single value, which indicates the number density, meaning the number of particles that are in a specified volume. Only this single value is used for the actual calculation of the particle load.

In accordance with a preferred further embodiment of the optical particle sensor device, the evaluation device is designed to determine an estimated value for the particle load for at least part of the estimated particle values respectively and to take these estimated values for the particle load as a basis for determining the at least one output value for the particle load. In accordance with this embodiment, the particle load is thus determined separately for a plurality of estimated particle values and, preferably, for each individual one of the estimated particle values. Based on these different estimated values, a single output value is then generated and output. When determining the output value, estimated values for the particle load can again be ignored, which are found to be erroneous, for example, because the deviation of individual estimated values for the particle load from a mean value of the estimated values for the particle load exceeds a specified threshold. In addition, it is also possible to weight various estimated values differently for the particle load in order to calculate the output value for the particle load.

In accordance with a preferred further embodiment of the optical particle sensor device, the evaluation device is designed to take into account status information when determining the estimated particle values, which reports the functional status of the emitter device and/or the detector device in relation to the single measurement signals. The status information can relate, in particular, to a failure and/or an error of the emitter device and/or the detector device. Thus, a failure of individual components can be detected by means of a sensor device, which can be a part of the optical particle sensor device. For example, a failure of laser drivers can be detected, which are assigned to lasers of the emitter device and which emit the individual measurement laser beams. Furthermore, a failure of photodiodes or evaluation elements of the photodiodes can be detected, wherein the photodiodes are part of the detector device and are assigned to the respective single measurement signals. Therefore, by means of the status information, thereby, intrinsic errors can be detected. If the status information detects that the functional status of individual components of the emitter device and/or the detector device is not optimal or that the components have even completely failed, this will be taken into consideration when determining the estimated particle values so that only single measurement signals are used, which have been emitted and detected without errors. In the case of minor errors, the erroneous single measurement signals can also be taken into account with a lower weighting factor.

In accordance with a preferred further embodiment of the optical particle sensor device, the evaluation device is designed to determine estimated particle values based on each individual single measurement signal. A corresponding estimated particle value is assigned to each single measurement signal. In addition or as an alternative, the evaluation device can determine the estimated particle values based on each number n of different single measurement signals, wherein the number n is less than or identical to the multitude N. If, for example, the optical emitter device emits exactly three measurement laser beams, estimated particle values can be determined, which are based on an individual single measurement signal, and/or estimated particle values, which are based on two single measurement signals respectively and/or estimated particle values, which are based on all three single measurement signals. By weighting the single measurement signals differently, any number of estimated particle values can be generated. Preferably however, the single measurement signals can also be weighted in an identical manner. In this case, three estimated particle values result for three single measurement signals, which are assigned to a single measurement signal respectively, three estimated particle values, which are assigned to two single measurement signals respectively, as well as an estimated particle value, which is assigned to all three single measurement signals.

In accordance with a preferred further embodiment of the optical particle sensor device, the evaluation device is designed to compare the detected estimated particle values and/or the detected estimated values for the particle load and to weight them with regard to their deviation from a mean value of the detected estimated particle values or a mean value of the estimated values for the particle load. The evaluation device takes into account only those detected estimated particle values and/or detected estimated values for the particle load when determining the output value for the particle load, the deviation of which from the mean value does not exceed a specified measure. More generally, the weighting factor can depend on the deviation from the mean value. The larger the deviation, the smaller the weighting factor chosen in order to exclude potentially erroneous values or at least to take them under consideration with a lower level of weighting.

In accordance with a preferred further embodiment of the optical particle sensor device, the evaluation device is designed to take a mean value of the detected estimated particle values as a basis for determining the output value for the particle load. Therefore, an individual overall estimated value is generated from the estimated particle values. In addition or as an alternative, the determination of the output value for the particle load can be based on a mean value of the detected estimated values for the particle load. The estimated values for the particle load are thereby merged into a single value.

In accordance with a preferred further embodiment of the optical particle sensor device, the optical emitter device comprises at least one laser diode. The at least one laser diode can be, in particular, a VCSEL (vertical cavity surface emitting laser). This is a light-emitting diode where the light is emitted perpendicular to the plane of the semiconductor chip. In addition or as an alternative, the detector device comprises at least one photodiode. Preferably, the at least one photodiode can be integrated into the at least one laser diode. The evaluation device is designed to evaluate the photocurrent generated by the at least one photodiode as a single measurement signal in order to determine at least one parameter for the determination of estimated particle values. The parameter can comprise at least one of the following: a maximum amplitude of the photocurrent, a frequency, a signal-to-noise ratio and a point in time, at which the amplitude of the photocurrent exceeds a specified threshold.

In accordance with a preferred further embodiment of the method, on the basis of the at least two estimated particle values, a total number of particles per volume is determined. In addition or as an alternative, an estimated value for the particle load is determined for at least part of the estimated particle values respectively. The total number of particles per volume and/or these estimated values for the particle load are taken as a basis for determining the at least one output value for the particle load.

In accordance with a preferred further embodiment of the method, status information is taken into account when determining the estimated particle values, which reports the functional status of the emitter device and/or the detector device in relation to the single measurement signals, wherein it can, in particular, have to do with a failure or an error.

In accordance with a preferred further embodiment of the method, the estimated particle values are determined based on each individual single measurement signal and/or based on each number n of different single measurement signals, wherein the number n is less than or identical to the multitude N.

In accordance with a preferred further embodiment of the method, the detected estimated particle values are compared with each other and/or the detected estimated values for the particle load are compared with each other. The detected estimated particle values are weighted with regard to their deviation from a mean value of the detected estimated particle values or a mean value of the estimated values for the particle load. Only those detected estimated particle values and/or detected estimated values for the particle load are taken into account when determining the output value for the particle load, the deviation of which from the mean value does not exceed a specified threshold.

In accordance with a preferred further embodiment of the method, the output value for the particle load is determined as a mean value of the detected estimated particle values and/or the detected estimated values for the particle load.

BRIEF DESCRIPTION OF THE DRAWINGS

The figures show.

In all figures, identical or functionally identical elements and devices are provided with the same reference numbers.

DESCRIPTION OF THE EXEMPLARY EMBODIMENTS

Figure 1:
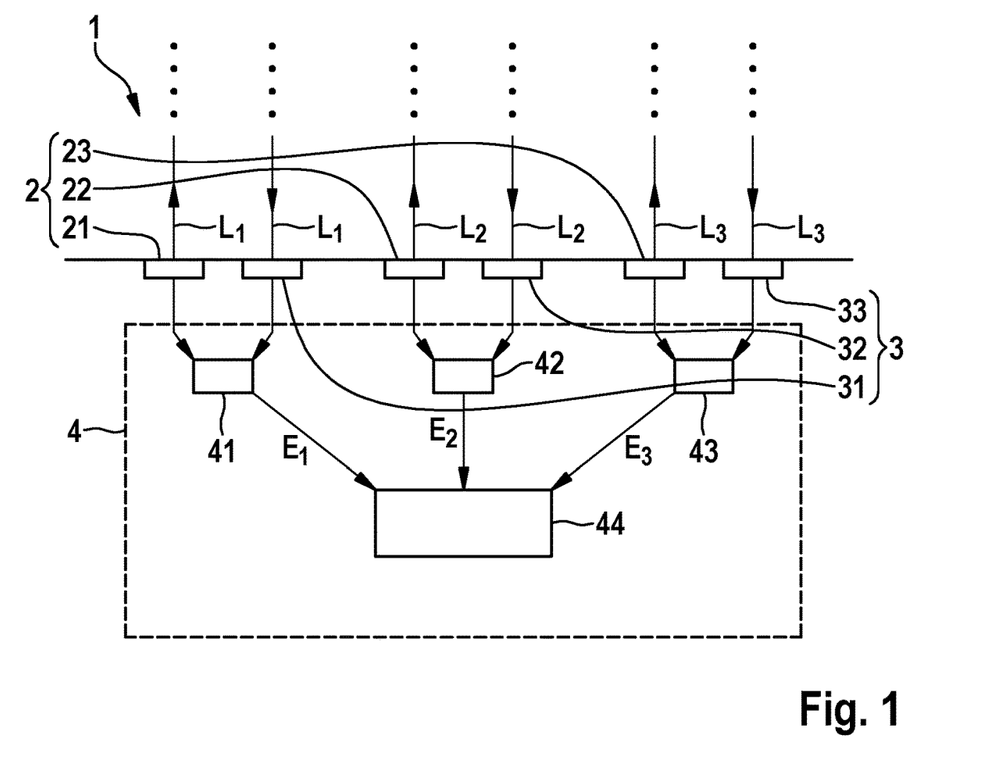
FIG. 1 a schematic cross-sectional view of an optical particle sensor device in accordance with an embodiment of the invention.

FIG. 1 shows a schematic cross-sectional view of an optical particle sensor device 1. The optical particle sensor device 1 can preferably be integrated into a mobile device, in particular, into a surface of a smartphone or into a tablet or laptop. However, it is also possible that the optical particle sensor device 1 is integrated into a mobile or permanently installed sensor device, which can optionally comprise additional sensors.

The optical particle sensor device 1 comprises an optical emitter device 2, which comprises three laser diodes 21, 22, 23. The laser diodes 21, 22, 23 are designed as VCSELs and emit respective measurement laser beams $L_1$, $L_2$, $L_3$. The measurement laser beams $L_1$, $L_2$, $L_3$ are emitted in different spatial directions by means of suitable lens and/or mirror devices.

The optical emitter device 2 is generally designed to emit a multitude N of measurement laser beams. In the simplest case, the optical emitter device 2 thus transmits exactly two measurement laser beams. Preferably, however, the optical emitter device 2 is designed to emit at least three measurement laser beams. The at least three measurement laser beams are preferably emitted in different spatial directions. Assuming there is a homogeneous particle stream, when using at least three measurement laser beams, the projections of vectorial particle characteristics, such as a speed or acceleration of the particles of the particle stream, can be detected at the various spatial directions. Since the spatial directions differ, the vectorial particle characteristics can be fully reconstructed. When using four or more measurement laser beams, certain redundancies occur, whereby plausibility analyses can be additionally conducted in order to improve the reliability of the results.

Furthermore, the optical particle sensor device 1 comprises a detector device 3, which comprises three photodiodes 31, 32, 33, which are each assigned to a laser diode 21, 22, 23 and are integrated into these. The optical emitter device 2 and the detector device 3 are integrated into a VCSEL sensor chip, in which a self-mixing interference analysis function is furthermore integrated. For this purpose, a schematically drawn-in evaluation device 4 is provided, which comprises first to third evaluation units 41, 42, 43, which are each assigned to a combination of a photodiode 31, 32, 33 and a laser diode 21, 22, 23. The measurement laser beams $L_1$, $L_2$, $L_3$ are scattered on particles in a vicinity of the optical particle sensor device 1 and interfere with the emitted measurement laser beams $L_1$, $L_2$, $L_3$, wherein a photocurrent is generated in the respective photodiodes 31, 32, 33. The first to third evaluation units 41, 42, 43 measure the respective photocurrent and generate corresponding single measurement signals $E_1$, $E_2$, $E_3$.

The evaluation device 4 furthermore comprises a fourth evaluation unit 44, which is coupled with first to third evaluation units 41, 42, 43 and evaluates the single measurement signals $E_1$, $E_2$, $E_3$. The fourth evaluation unit 44 generates parameters for the determination of estimated particle values for the number of particles per volume using the single measurement signals $E_1$, $E_2$, $E_3$. This can be understood as a maximum amplitude of the photocurrent, a determination of the frequencies, a signal-to-noise ratio and a point in time, at which the amplitude of the photocurrent exceeds a specified threshold. Based on these parameters, the fourth evaluation unit 44 can determine certain characteristics of the particles. For example, the fourth evaluation unit 44 can calculate a speed of the particles based on a Doppler shift. Furthermore, the fourth evaluation unit 44 can calculate a residence time, meaning the time during which particles are in the detection range of the measurement laser beams $L_1$, $L_2$, $L_3$. The fourth evaluation unit 44 can also determine additional quantities such as distances of the particles from the optical particle sensor device 1.

Based on all these parameters, the fourth evaluation unit 44 determines estimated particle values for the number of particles per volume, meaning a number density of particles. Based on the estimated particle values for the number of particles per volume, the fourth evaluation unit 44 further calculates a particle load. As is described above, for this purpose, the PM categorisation can be taken as a basis. In this way, the fourth evaluation unit 44 can calculate the corresponding particle load based on the estimated particle values for the number of particles per volume and under the aid of a model, which depicts the parameters or diameters of the dust particles and the distribution of the mass or the density of the dust particles. For example, $PM_x$ values can be calculated, wherein only particles up to a certain diameter are taken into account, such as the coarse dust, fine dust and ultrafine dust values described above.

To calculate the estimated particle values for the number of particles per volume, the fourth evaluation unit 44 takes into account different subsets of the single measurement signals $E_1$, $E_2$, $E_3$.

Figure 2:
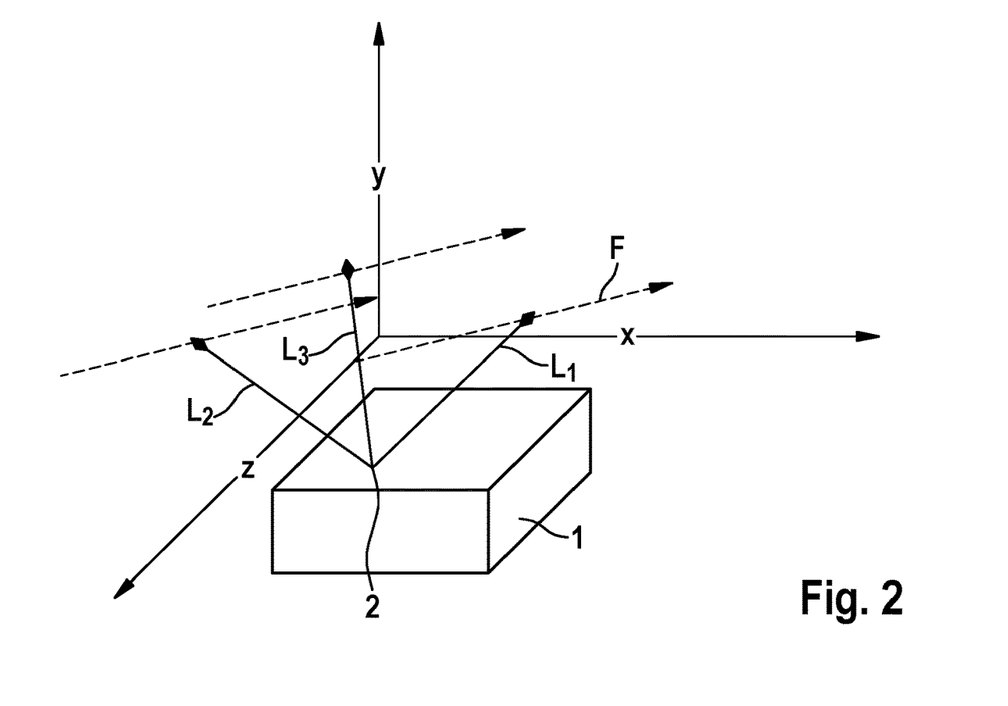
FIG. 2 a schematic oblique view of the optical particle sensor device shown in FIG. 1.

In FIG. 2, a first exemplary scenario is illustrated. A particle stream F moves in a laminar manner, meaning without the occurrence of major turbulences, meaning turbulences or cross-currents, through the detection range of the measurement laser beams $L_1$, $L_2$, $L_3$. The particles thus move at all detection points at which the measurement laser beams $L_1$, $L_2$, $L_3$ are scattered and reflected at the same speed in the same spatial direction. This is typically assumed if a particle stream flows along a surface, as is the case, for example, for a surface of a smartphone, into which the optical particle sensor device 1 is integrated.

In addition, in the first exemplary scenario, it is assumed that all units of the optical particle sensor device 1, meaning in particular the photodiodes 31, 32, 33 and laser diodes 21, 22, 23, as well as the corresponding evaluation units 41 to 43 operate in a fully functional and error-free manner. In this case, the fourth evaluation unit 44 for the different subsets of the single measurement signals $E_1$, $E_2$, $E_3$ will determine estimated particle values for the number of particles per volume, which are essentially identical. The same applies to the particle load derived from this.

Figure 3:
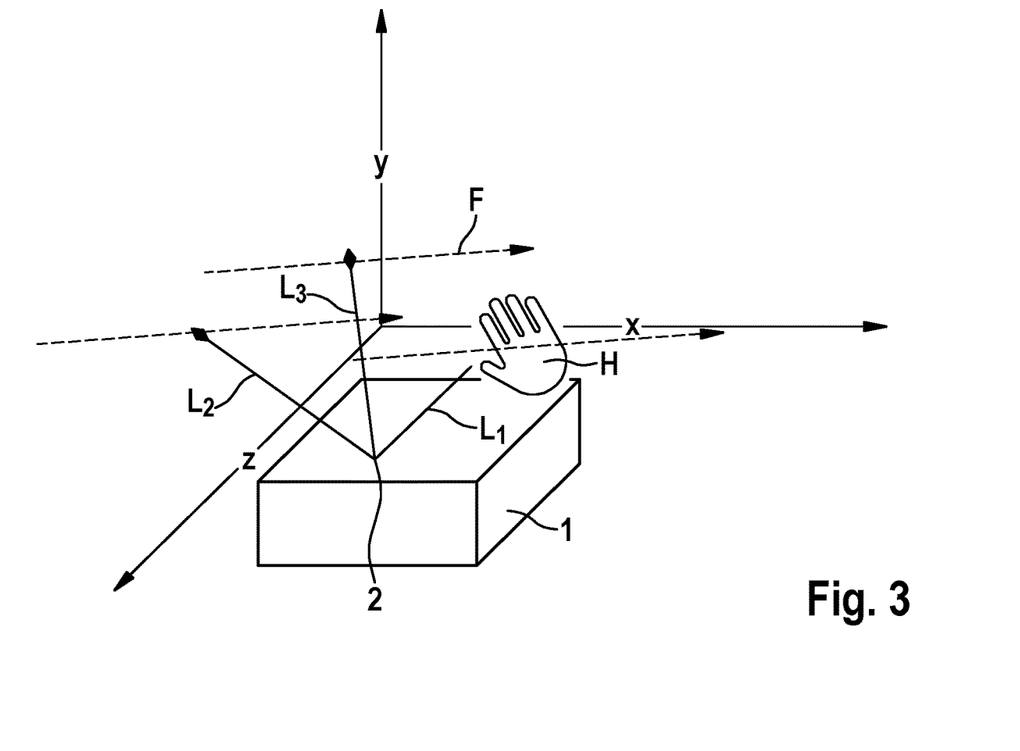
FIG. 3 a schematic oblique view of the optical particle sensor device shown in FIG. 1, wherein an object is located in the beam path of a measurement laser beam emitted by the optical emitter device.

A flawless and fault-free operation can, however, not be continuously guaranteed. Thus, in FIG. 3 a second exemplary scenario is illustrated, wherein a disturbing object, such as a hand H of the user, is located in the beam path of one of the measurement laser beams $L_1$, $L_2$, $L_3$.

Figure 4:
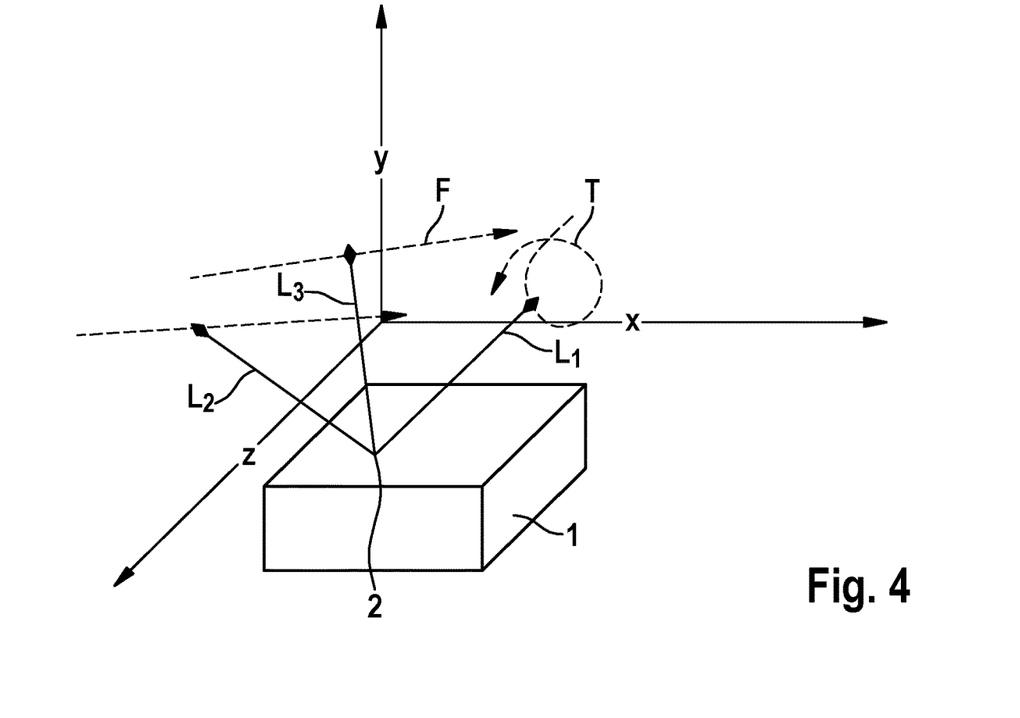
FIG. 4 a schematic oblique view of the optical particle sensor device shown in FIG. 1, wherein the particles are subject to a turbulent flow in the beam path of one of the measurement laser beams emitted by the optical emitter device.

Another scenario is illustrated in FIG. 4, wherein a turbulence T occurs at a detection point in the beam path of a measurement laser beam $L_1$ so that the speed and the speed direction of the particles at this detection point differ from the speed and the speed direction in the beam paths of the other measurement laser beams $L_2$, $L_3$.

In addition to such extrinsic sources of error, intrinsic sources of error may also occur, such as a failure or error of individual components, in particular of photodiodes 31, 32, 33 and/or laser diodes 21, 22, 23.

If such sources of error occur, the estimated particle values for the number of particles per volume based on different single measurement signals $E_1$, $E_2$, $E_3$ will differ from each other.

Figure 5:
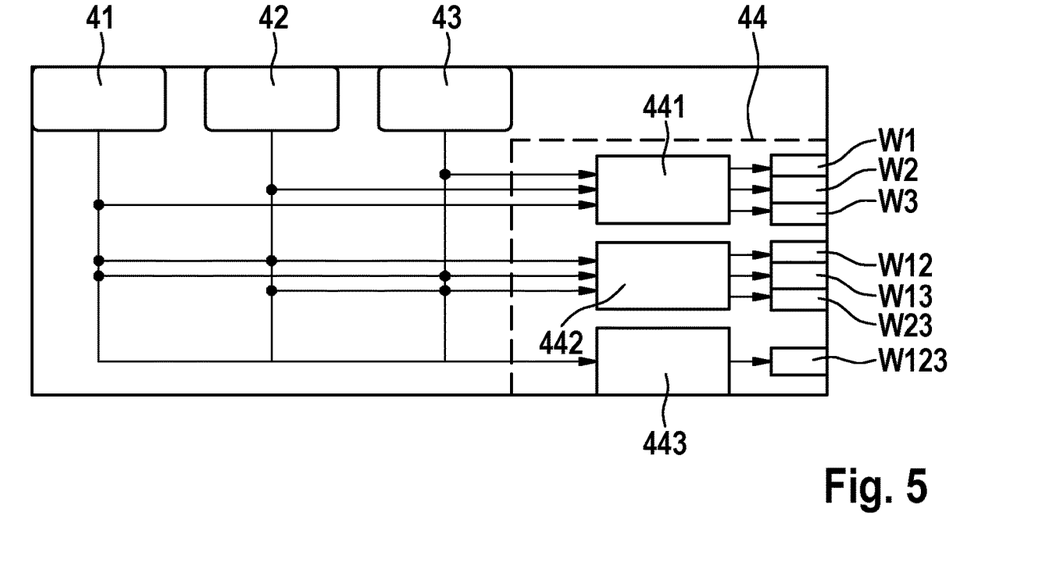
FIG. 5 a schematic block diagram for illustrating the evaluation of the single measurement signals by the evaluation device.

A way to generate different estimated particle values for the number of particles per volume is illustrated in FIG. 5. Thus, the single measurement signals $E_1$, $E_2$, $E_3$ are transmitted from the first to third evaluation units 41, 42, 43 onto the fourth evaluation unit 44.

In the case of a first evaluation algorithm 441, only an individual single measurement signal $E_1$, $E_2$, $E_3$ is used to calculate an estimated particle value for the number of particles per volume. For each single measurement signal $E_1$, $E_2$, $E_3$, exactly one estimated particle value W1, W2, W3 is generated for the number of particles per volume.

In a second evaluation algorithm 442, two single measurement signals $E_1$, $E_2$, $E_3$ are respectively used to calculate an estimated particle value for the number of particles per volume. Therefore, three other estimated particle values W12, W13, W23 are produced for the number of particles per volume, wherein a first estimated particle value W12 for the number of particles per volume is based on the first single measurement signal $E_1$ and the second single measurement signal $E_2$, a second estimated particle value W13 for the number of particles per volume is based on the first single measurement signal $E_1$ and the third single measurement signal $E_3$, and a third estimated particle value W23 for the number of particles per volume is based on the second single measurement signal $E_2$ and the third single measurement signal $E_3$.

Finally, in the case of a third evaluation algorithm 443, a further estimated particle value W123 for the number of particles per volume is generated, which is based on all three single measurement signals $E_1$, $E_2$, $E_3$.

When calculating an estimated particle value for the number of particles per volume on the basis of a plurality of single measurement signals $E_1$, $E_2$, $E_3$, the respective above-described parameters, which are generated on the basis of the single measurement signals $E_1$, $E_2$, $E_3$, can be averaged in order to determine a single characteristic used to calculate the estimated particle value for the number of particles per volume.

The fourth evaluation unit 44 is further designed to compare the estimated particle values for the number of particles per volume with each other. For this purpose, the fourth evaluation unit 44 can calculate a mean value of the estimated particle values for the number of particles per volume. If individual estimated particle values deviate from the mean value of the estimated particle values for the number of particles per volume by a specified value, or if another statistical parameter, such as a variance, exceeds a specified value, the fourth evaluation unit 44 detects that the corresponding estimated particle value for the number of particles per volume can be erroneous. The erroneous estimated particle values for the number of particles per volume can be ignored in further evaluation steps, meaning for calculating the particle load, or be taken into account with a lower weighting. In this way, in accordance with an embodiment, a total number of particles per volume can be determined, wherein only those estimated particle values for the number of particles per volume are taken under consideration, which have not been identified as being erroneous.

By identifying less trustworthy estimated particle values for the number of particles per volume, the evaluation unit 44 can possibly detect an error-prone single measurement signal $E_1$, $E_2$, $E_3$. In this case, for example, an error message can be output to a user. The user can optionally also be shown the number or exact specification of the failed measurement laser beams $L_1$, $L_2$, $L_3$, which can facilitate troubleshooting. In the simplest case, the user removes the disturbing object, such as his hand, from the detection area, thereby allowing for error-free operation to take place again.

In accordance with a further embodiment, the optical particle sensor device can also be designed to detect a functional status of the emitter device 2 and/or of the detector device 3, whereby, in particular, a failure or an error of individual components is to be understood.

Figure 6:
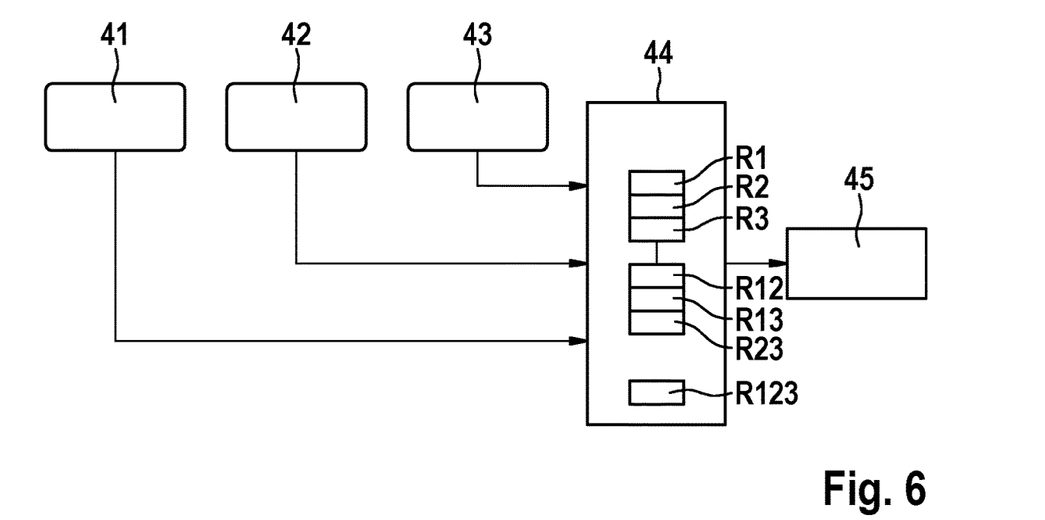
FIG. 6 a further schematic block diagram for illustrating the evaluation of the single measurement signals by the evaluation device.

In FIG. 6, a corresponding evaluation is illustrated. Thus, the first to third evaluation units 41, 42, 43 in addition to the single measurement signals $E_1$, $E_2$, $E_3$ also transmit status information to the fourth evaluation unit 44. This can assess the reliability of the single measurement signals $E_1$, $E_2$, $E_3$ on the basis of the status information. The above-described estimated particle values W1, W2, W3, W12, W13, W23, W123 are assigned for reliability based on the reliability of the single measurement signals $E_1$, $E_2$, $E_3$ values R1, R2, R3, R12, R13, R23 R123 and a corresponding signal 45 will be output.

Figure 7:
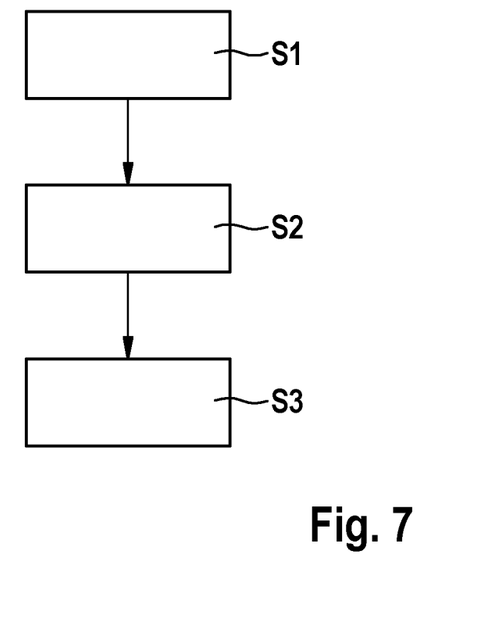
FIG. 7 a flowchart of a method for operating an optical particle sensor device in accordance with an embodiment of the invention.

In FIG. 7, a flowchart of a method for operating an optical particle sensor device 1 is illustrated, which can correspond to one of the above-described embodiments.

In a first method step S1, the optical emitter device 2 of the optical particle sensor device 1 is designed to emit a multitude N of measurement laser beams $L_1$, $L_2$, $L_3$ into a vicinity of the optical particle sensor device 1.

The scattered measurement laser beams $L_1$, $L_2$, $L_3$ are detected in a second method step S2 by the detector device 3.

In a further method step S3, the single measurement signals $E_1$, $E_2$, $E_3$ are evaluated to determine an output value for the particle load. For this purpose, at least two estimated particle values for the number of particles per volume are first determined, which are based on different subsets of the single measurement signals $E_1$, $E_2$, $E_3$. In particular, single measurement signals $E_1$, $E_2$, $E_3$ which are at least partially different from each other can be used to calculate corresponding estimated particle values for the number of particles per volume. Furthermore, the subsets can comprise various numbers of elements. For the calculation of the estimated particle values for the number of particles per volume, a plurality of parameters are calculated on the basis of the single measurement signals $E_1$, $E_2$, $E_3$, which can comprise the time progression of a photocurrent of the respective photodiode 31, 32, 33. The parameters can, in particular, comprise a maximum amplitude of the photocurrent, a frequency, a single-to-noise ratio and a point in time, at which the amplitude of the photocurrent exceeds a specified threshold. These parameters can be used to determine the characteristics of the particles, in particular speeds, residence times and spacings of the particles, from which the estimated particle values for the number of particles per volume can be determined.

Finally, the estimated particle values for the number of particles per volume are used to determine an output value for the particle load.

By comparing different estimated particle values for the number of particles per volume, extrinsic and intrinsic sources of error can be detected, particularly if statistical deviations of individual estimated particle values for the number of particles per volume occur. In this case, under certain circumstances, error-prone single measurement signals $E_1$, $E_2$, $E_3$ can be identified. These single measurement signals $E_1$, $E_2$, $E_3$ and the estimated particle values based on them for the number of particles per volume are ignored or merely weighted at a low level for further evaluation steps. The weighting can generally depend on a statistical deviation, such as the mean value or median of the estimated particle values for the number of particles per volume. Alternatively, only the most reliable estimated particle value can also be used to calculate the particle load.

In addition, the functional status of the emitter device 2 and/or the detector device 3 can be taken into account, wherein single measurement signals $E_1$, $E_2$, $E_3$, which are based on erroneous or failed components, are ignored or at least merely weighted at a low level. Additional sensor elements of the optical particle sensor device 1 may be provided for the detection of erroneous or failed components.

To calculate the particle load, a mean value formation across certain values is preferably carried out. For example, the estimated particle values for the number of particles per volume can be used to determine a total number of particles per volume, meaning a single value for the particles per volume. This total number of particles per volume is finally used to determine a single output value for the particle load.

In accordance with other embodiments, a corresponding estimated value for the particle load can be determined for each estimated particle value for the number of particles per volume. At the end of the method, an output value for the particle load is generated by forming a mean value for the estimated values for the particle load.

Hybrid forms are also possible, according to which a plurality of estimated particle values for the number of particles per volume are initially averaged in order to determine a plurality of total numbers of particles per volume. For each of the total numbers of particles per volume or for subsets of the total numbers of particles per volume, corresponding estimated values for the particle load are determined and then, by averaging these values, an output value for particle load is determined.

The invention claimed is:

1. An optical particle sensor device, comprising:
   an optical emitter device, which is designed to emit a multitude of measurement laser beams into a vicinity of the optical particle sensor device;
   a detector device, which is designed to detect the measurement laser beams scattered on particles in the vicinity of the optical particle sensor device and to generate a single measurement signal assigned to this for each measurement laser beam; and
   an evaluation device, which designed to determine at least one estimated particle value for the number of particles per volume using at least one single measurement signal,
   characterized in that the evaluation device is designed
   a. to determine at least two estimated particle values for the number of particles per volume, which are based on at least partially different single measurement signals and/or a different number of single measurement signals and,
   b. on the basis of at least part of the estimated particle values, to determine at least one output value for a particle load.

2. The optical particle sensor device according to claim 1, characterized in that the evaluation device is designed to determine, on the basis of the at least two estimated particle values, a total number of particles per volume, which are used as a basis for determining the at least one output value for the particle load.

3. The optical particle sensor device according to claim 1, characterized in that the evaluation device is designed to determine an estimated value for the particle load for at least part of the estimated particle values respectively and to take these estimated values for the particle load as a basis for determining the at least one output value for the particle load.

4. The optical particle sensor device according to claim 1, characterized in that the evaluation device is designed to take into account status information when determining the estimated particle values, which reports the functional status of the emitter device and/or the detector device in relation to the single measurement signals, in particular a failure or an error.

5. The optical particle sensor device according to claim 1, characterized in that the evaluation device is designed to determine estimated particle values
   a. based on each individual single measurement signal, and/or,
   b. based on each number n of different single measurement signals, wherein the number n is less than or identical to the multitude N ($n \leq N$).

6. The optical particle sensor device according to claim 1, characterized in that the evaluation device is designed to
   a. compare the detected estimated particle values and/or the detected estimated values for the particle load and to weight them with regard to their deviation from a mean value of the detected estimated particle values or a mean value of the estimated values for the particle load, and
   b. to take into account only those detected estimated particle values and/or detected estimated values for the particle load when determining the output value for the particle load, the deviation of which from the mean value does not exceed a specified measure.

7. The optical particle sensor device according to claim 1, characterized in that the evaluation device is designed to take a mean value of the detected estimated particle values and/or the detected estimated values for the particle load as a basis for determining the output value for the particle load.

8. The optical particle sensor device according to claim 1,
   a. wherein the optical emitter device comprises at least one laser diode, in particular a VCSEL, and/or the detector device comprises at least one photodiode, in particular at least one photodiode, which is integrated into the at least one laser diode,
   b. wherein the evaluation device is designed to evaluate the photocurrent generated by the at least one photodiode as a single measurement signal in order to determine at least one parameter for the determination of estimated particle values, in particular a maximum amplitude of the photocurrent, a frequency, a signal-to-noise ratio and a point in time, at which the amplitude of the photocurrent exceeds a specified threshold.

9. A method for operating an optical particle sensor device
   a. with an optical emitter device for emitting a multitude N of measurement laser beams into a vicinity of the optical particle sensor device,
   b. with a detector device for detecting the measurement laser beams scattered on particles in the vicinity of the optical particle sensor device, wherein, for each measurement laser beam, a single measurement signal assigned to this is generated, and
   c. with an evaluation device for determining at least one estimated particle value for the number of particles per volume using at least one single measurement signal,
   characterized in that at least two estimated particle values are determined for the number of particles per volume, which are based on at least partially different single measurement signals and/or a different number of single measurement signals and in that, on the basis of at least part of the detected estimated particle values, at least one output value is determined for a particle load.

10. The method according to claim 9, characterized in that, on the basis of the at least two estimated particle values, a total number of particles per volume is determined, and/or in that an estimated value for the particle load is determined for at least one part of the estimated particle values respectively, and in that the total number of particles per volume and/or these estimated values for the particle load are taken as a basis for determining the at least one output value for the particle load.

11. The method according to claim 9, characterized in that status information is taken into account when determining the estimated particle values,
   which reports the functional status of the emitter device and/or the detector device in relation to the single measurement signals, in particular a failure or an error.

12. The method according to claim 9, characterized in that estimated particle values are determined
   a. based on each individual single measurement signal, and/or
   b. based on each number n of different single measurement signals, wherein the number n is less than or identical to the multitude N ($n \leq N$).

13. The method according to claim 9, characterized in that the detected estimated particle values are compared with each other and/or the detected estimated values for the particle load are compared with each other,
   in that the detected estimated particle values are weighted with regard to their deviation from a mean value of the detected estimated particle values or a mean value of the estimated values for the particle load, and
   in that the evaluation device takes into account only those detected estimated particle values and/or detected estimated values for the particle load when determining the output value for the particle load, the deviation of which from the mean value does not exceed a specified measure.

14. The method according to claim 9, characterized in that the output value for the particle load is determined as a mean value of the detected estimated particle values and/or the detected estimated values for the particle load.

* * * * *